United States Patent [19]

Ditzik

[11] Patent Number: 5,589,849

[45] Date of Patent: Dec. 31, 1996

[54] DISPLAY MONITOR POSITION ADJUSTMENT APPARATUS

[76] Inventor: Richard J. Ditzik, 3143 Carnegie Ct., San Diego, Calif. 92122

[21] Appl. No.: 280,148

[22] Filed: Jul. 25, 1994

Related U.S. Application Data

[63] Continuation of Ser. No. 771,856, Oct. 7, 1991, abandoned, which is a continuation-in-part of Ser. No. 375,366, Jul. 3, 1989, abandoned.

[51] Int. Cl.$^6$ .................................................. G09G 1/06
[52] U.S. Cl. .......................... 345/126; 345/905; 248/921
[58] Field of Search ................................... 345/156, 126, 345/173, 179, 905, 121; 312/7.2, 194; 248/917, 918, 919, 920, 921, 922, 923, 924; 379/96; 348/825, 827, 836; 361/681, 682

[56] References Cited

U.S. PATENT DOCUMENTS

| | | | |
|---|---|---|---|
| D. 280,820 | 10/1985 | Winters et al. | D14/106 |
| 4,361,725 | 11/1982 | Dagnelie et al. | 178/19 |
| 4,365,561 | 12/1982 | Teille et al. | 108/7 |
| 4,379,429 | 4/1983 | Gubbe et al. | 248/918 |
| 4,449,762 | 5/1984 | Turner | 312/196 |
| 4,550,316 | 10/1985 | Whetstone et al. | 340/710 |
| 4,562,482 | 12/1985 | Brown | 358/254 |
| 4,589,621 | 5/1986 | Hunt et al. | 248/586 |
| 4,631,356 | 12/1986 | Taguchi et al. | 340/784 |
| 4,640,199 | 2/1987 | Zigman | 108/6 |
| 4,653,086 | 3/1987 | Lanbe | 379/100 |
| 4,659,876 | 4/1987 | Sullivan et al. | 379/100 |
| 4,668,026 | 5/1987 | Lapeyre et al. | 312/7.2 |
| 4,669,789 | 1/1987 | Pemberton | 312/7.2 |
| 4,716,542 | 12/1987 | Peltz et al. | 364/900 |
| 4,725,106 | 2/1988 | Shields et al. | 312/7.2 |
| 4,755,009 | 7/1988 | Price et al. | 312/194 |
| 4,766,422 | 8/1988 | Walters et al. | 312/194 |
| 4,779,139 | 10/1988 | Lapeyre et al. | 358/252 |
| 4,831,368 | 5/1989 | Masimo et al. | 340/727 |
| 4,873,398 | 10/1990 | Hubby | 340/706 |
| 4,939,509 | 7/1990 | Bartholomew et al. | 345/2 |
| 4,962,521 | 10/1990 | Komatsu et al. | 379/96 |
| 5,008,853 | 4/1991 | Bly et al. | 345/2 |

FOREIGN PATENT DOCUMENTS

| | | |
|---|---|---|
| 59-7339 | 5/1982 | Japan . |
| 0184925 | 10/1984 | Japan . |
| 1133757 | 2/1967 | United Kingdom . |

OTHER PUBLICATIONS

D. Shear, "Workstations", Oct. 29, 1987; pp. 169–176; *Electronic Design Magazine*.

B. Nicholls, "The Current Crop", Feb. 1989; pp. 235–244; Byte Magazine.

N. Baran, "Two Worlds Converge", Feb. 1989; pp. 229–233; *Byte Magazine*, Feb. 1989.

R. Weiss, "Powerful Unix–based Workstations take on Mini- –Computer, Mainframes", May 15, 1986; pp. 75–81; *Electronic Design*.

*Primary Examiner*—Richard Hjerpe
*Assistant Examiner*—Doon Chow

[57] ABSTRACT

A man-computer-man communications system, including a computer workstation (10), which is comprised of a display device (22), graphic tablet (18), stylus (14), and computer unit (24), where the physical orientation of the display device screen (16) is made adjustable in inclination angle, azimuth angle, and elevation height. The active area of the graphic tablet is a transparent surface area (18), which is coincident to the display screen and is approximately the same size as the display screen. The graphic tablet device may include active or passive stylus (14). A keyboard unit (12) and telephone unit (28) may be added to the workstation. An external communications system may be added to transmit and receive data to or from remote computers or other workstations. The display screen angle can be adjusted to inclination angles between horizontal and vertical orientations. The computer unit (24) controls the operation of the workstation and external communications.

4 Claims, 4 Drawing Sheets

DISPLAY MONITOR POSITION ADJUSTMENT APPARATUS

This application is a continuation of application Ser. No. 07/771,856, filed Oct. 7, 1991, now abandoned, which is a continuation-in-part of application Ser. No. 07/375,366, filed Jul. 3, 1989, now abandoned.

BACKGROUND OF THE INVENTION

1. Field of the Invention

This invention relates to communication systems used by individuals for general tele-writing, sketching and drawing of hand written information, to be transmitted to other individuals via computer systems. In particular it relates to computer workstations comprised of electrical and mechanical devices for the input, computation, and output of data, resulting an integrated ergonomically designed human-computer interface system.

2. Description of the Prior Art

In the following, a computer workstation is defined to be a combination of devices and apparatus, which may include computer hardware and software, that a person uses or operates during the performance various computing and communication tasks. These tasks includes, but is not limited to, technical calculations, business computations and local/remote communications. Prior art in this field includes many computer workstations and personal computers. Henceforth, a computer workstation will include personal computers, computer terminals, computer consoles, and like devices.

The person operating the workstation will be referred to as the user. Display devices used in computer workstations can be classified into two broad categories. The first category is often referred to as direct-view display devices, in which the user, looks directly at the actual display screen, not projected light image from other components. Most of the display devices in the prior art belong to this category, examples include the Cathode Ray Tube (CRT), liquid crystal, and plasma panel displays. The other category is referred to as non-direct view or projected image displays, where examples include the optical CRT projector and some laser addressed liquid crystal projection devices.

There are presently many computer workstations on the market, many having similar components and physical arrangements. The available workstations are very well known to those skilled in the workstation art. The majority of computer workstations have a CRT display device placed on the table or desk, a mouse unit, a computer unit, and an alphanumeric keyboard. The prior art CRT or other direct-view displays usually have the display screen at near vertical or near 45 degree screen inclinations. A graphic tablet is defined to be an electrical device, which repeatedly measures the position of a stylus, pen or a user's finger over a defined area, encodes the positions into a digital signal, and transmits the data to a computer. A stylus is defined to be any elongated pen-like object that can be used for writing or sketching, including the user's finger. The writing stylus is typically used to point, write, sketch, or draw onto the graphic tablet's active area, referred to as the encoding area.

Prior art in computer workstations exist in various combinations of computers, display devices, and peripheral devices. However, the prior art fails to anticipate the importance of computer workstation with computer, graphic tablet, and display device, with inclined screen angle and its adjustability through large angles. U.S. Pat. No. 4,361,721 of Dagnelie discloses a teletext device having a graphic tablet and a CRT display at a screen inclination fixed near 45 degrees. However, the disclosure does not recognize display screen angle adjustability and does not teach a computing means of any type, which severely limits the usefulness of the device. U.S. Pat. No. 4,562,482 of Brown discloses a computerized executive workstation having a CRT display with a screen inclination angle of 50 degrees from the horizontal, during workstation operation. Although the CRT display can be retracted to a stored position below the work surface area, the teachings of Brown do not disclose a graphic tablet and do not disclose screen angle adjustability. These shortcomings restrict the workstation an operation without graphic input. The U.S. Pat. No. 4,668,026 of Lapeyre and Gundlach discloses a computer terminal cabinet for glare reduction, having a CRT display at an acute angle with the horizontal, a keyboard, and a printer. The reference teaches adjustable mounting only for glare reduction, and does not disclose a graphic tablet or a computer; thus also restricting the terminal to non-graphic input. U.S. Pat. No. 4,669,789 of Pemberton discloses a computer user's desk having a CRT monitor at about 60 degrees from the horizontal, a keyboard, and dual disk drives. This reference does not disclose a graphic tablet or screen angle adjustability to inclinations near the horizontal. Again, the prior art does not anticipate graphic input or screen angle adjustability for optimal stylus control.

All the prior art of computer workstations, terminals or cabinets, of which the above is representative, disclose either display screens near vertical orientation, disclose fixed acute inclinations, or limited screen angle adjustability for glare reduction. No prior art can be found that disclose screen angle adjustability from horizontally to vertical, with a graphic tablet and computer. The prior art workstations can be used in either the conventional manner or at a fixed acute screen angle, but not both. The prior art fails to recognize the importance of an ergonomically design graphic input workstation capable of adjusting between conventional orientation and graphic input mode of operation with stylus data entry and screen angle near the horizontal (about 30 degrees for horizontal).

Although several graphic tablet and stylus devices are available in the market, they usually have been combined with a display device by electrical means only. The typical display and graphic tablet combination has an opaque tablet laying horizontally on the desk or table next to the display device, connected by an electrical cable. Some graphic tablet prior art includes a transparent tablet placed over the display screen, but typically the screen orientation is near vertical. Although this arrangement works satisfactory for general purpose computer processing, it has some definite shortcomings when high resolution graphic processing is attempted. This is important because today software is becoming more graphic intensive than ever before.

An important problem exists if the screen angle is near vertical. The user's hand and wrist must bend to an uncomfortable position to write or sketch on the tablet-display surface. In addition, if the screen is at eye level, as with most prior art, the user's arm must be raised and held at position that will become very tiersome to the user, if used for a significant amount of time. The above is not just a matter of convenience. These shortcomings have severely restricted the use of standard graphic tablet input devices in the marketplace. This is one reason that the mouse input device has found wide spread use as a graphic input device for computer workstations and personal computers. Specifically, the mouse unit slides over the work table or desk, providing a support for the user's hand and arm. However, the mouse graphic input devices also have several disadvantages. First, it is difficult for the user to write, sketch, or draw with a mouse, because the device is too large and bulky to act as a pen or stylus. Secondly, the device must have a clear area on the table or desk for the unit to slide. This is valuable work space that some workstations cannot afford to lose.

Prior art workstations are inherently limited in their graphic interaction capabilities. The use of mice, joysticks, trackballs, and touch panels all have limitations for entering positional and functional data. For example, Computer-Aid Design (CAD) and Computer-Aided Design and Drafting (CADD) applications require precise and natural drawing and pointing means. An engineer or draftsman must be able to work at their workstation all day without great mental or physical fatigue. The prior art also does a poor job at providing a fatigue free workstation. In the area of teleconferencing applications, the computer workstation must be capable of real-time graphic and voice communications. The prior art workstations do not provide the means to accomplish that type of communications. In addition, conventional prior art workstations do not provide the ergonomically designed hardware support necessary for real-time electronic mail communications, while connected to either in Local Area Network communication means or remote communication means.

SUMMARY OF THE INVENTION

The disclosed invention solves the shortcomings of the prior art by arranging the standard workstation components so that it results in an integrated ergonomically designed universal workstation. The primary feature of the workstation is that its display device is oriented so that its screen angle is inclined at an angle. A transparent graphic tablet or stylus encoding means is placed over the display screen such that tablet or encoding area is parallel to the screen and above with a minimum space between them. Thus the tablet and screen appear to be one surface to the user. The display and tablet combination can be made to be adjustable through a multiplicity of screen angles. When the user writes with the stylus onto the tablet-surface and the surface is oriented at an angle of about 30 degrees, a natural writing and display surface exits, which provides a surprisingly synergistic and natural man-computer interface. In addition, the same workstation can be used for standard personal computing.

Accordingly, the present invention has for its first object a computer workstation with a display device oriented at an inclined angle near the horizontal such that the user can write, sketch or draw on the display screen-tablet surface it a natural manner, where it results in a new and surprising tele-writing, tele-drawing, and voice-graphics conferencing system.

Another equally important object of this invention is to provide a computer workstation having a graphic input means and adjustable screen orientation such that the user has an option of adjusting the screen for: (a) general purpose computer (e.g., vertical screen angle), (b) natural graphic input mode (e.g., screen angle of 30 degrees), or (c) a multiplicity of other orientations.

Another important object of this invention is to provide an ergonomically designed computer workstation integrating text, graphics, and voice means for the purpose of general purpose computing and communications.

A still another important object of this invention is to provide for a human-computer interface that results in a natural, easy to use, and useful computer workstation, personal computer, computer terminal, personal workstation, and/or computer console.

A further object of this invention is to allow precise hand controlled stylus pointing, sketching, writing, or drawing functions by a user for data entry into a computer means, computer network, distributed network, or communication system.

A still further object of this invention is to provide a workstation with graphic input and output means integrated with two way telephone voice means, such that real-time teleconferencing is made possible from the same workstation herein.

Another important object of this invention is to provide a computer based workstation capable of real-time electronic mail functions. This would involve communicating alphanumeric text, graphics, and images to remote locations, and having a capability of transmitting the user's hand writing, including his or her's personal signature, via electronic mail messages.

A further object of this invention is to provide an improved computer workstation for Computer-Aided Design and Computer-Aided Design and Drafting applications, as well as general purpose high resolution graphic image rendering systems.

Still further objects and advantages will become apparent form a consideration of the ensuing description and drawings.

DETAILED DESCRIPTION

Figure 1:
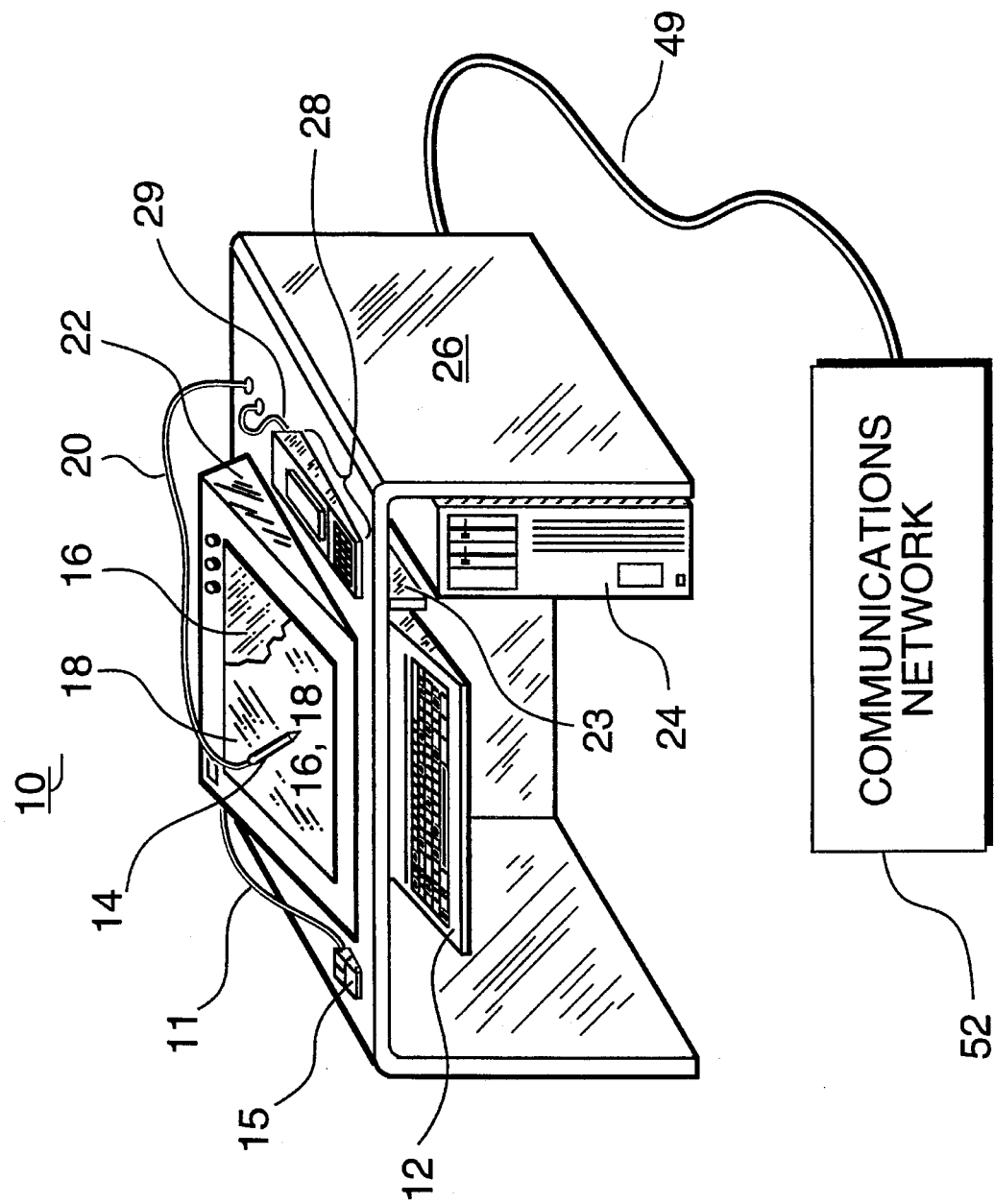
FIG. 1 is a perspective view of the computer workstation in accordance with the present invention.

The disclosed invention can be described with reference to the perspective view of FIG. 1, which shows one possible embodiment. The components of the computer workstation may be arranged in several different embodiments. In FIG. 1, a table support 26 physically supports a display device 22, a transparent graphic tablet surface area 18, a stylus 14, a computer keyboard unit 12, a mouse unit 15 and a computing means 24. The table support 26 may be a standard desk or pedestal, modified to physically support the above components, or it may be a specially design structure. All display devices define a display screen of a finite area. The display device 22 has a display screen 16, which is located under the graphic tablet surface 18 and is of equivalent size, as indicated in the figure. The display screen is inclined at an angle between the horizontal and 45 degrees. The angle of inclination is adjustable through a wide range of angles. The display device 22 has control circuitry which may internal to the screen housing or located some distance away. The control circuity may have one or more microprocessors associated with it.

Figure 2:
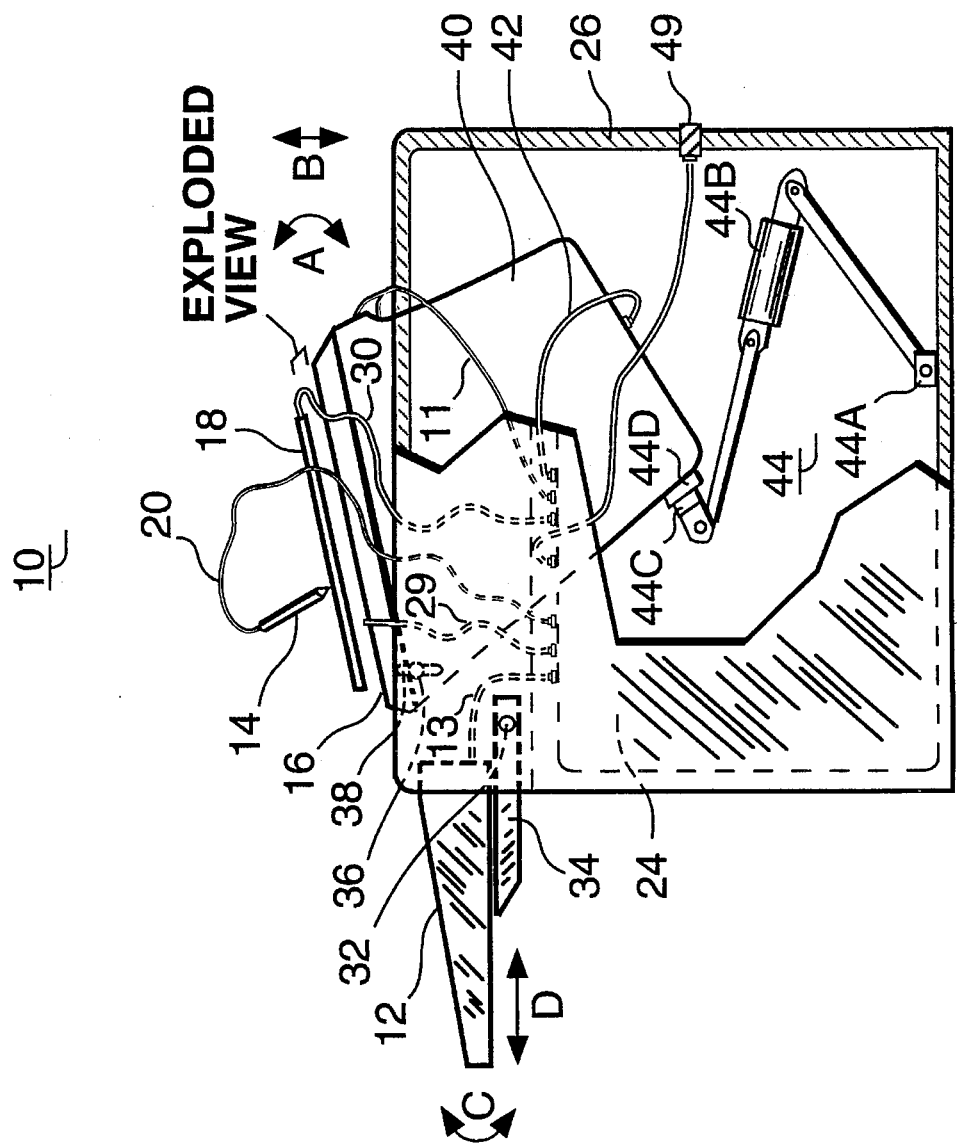
FIG. 2 is a right side view of the CRT embodiment of the invention, showing a hidden view, an exploded view and a break away view.
Figure 3:
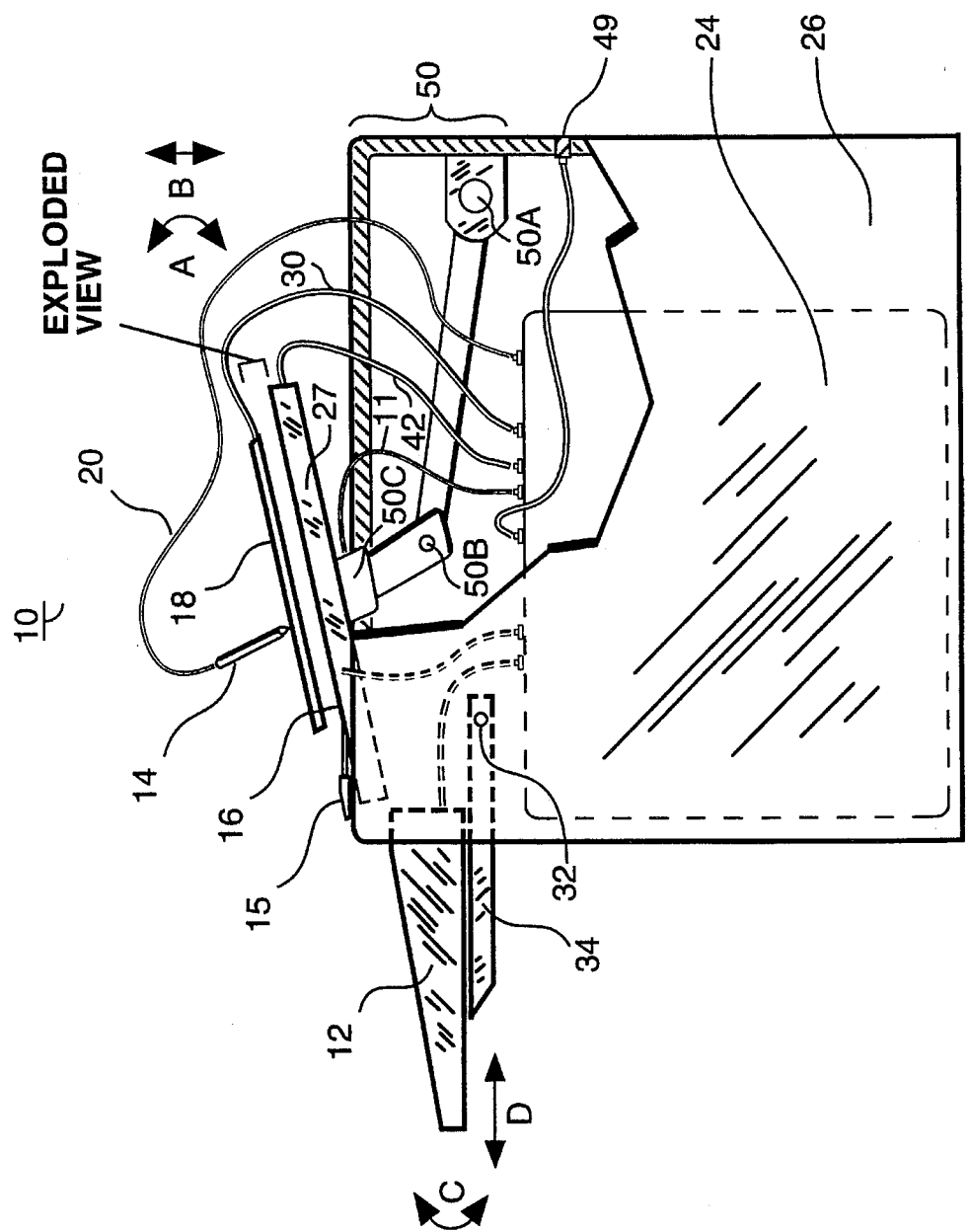
FIG. 3 is a right side view of the flat panel display embodiment of the invention, showing hidden view, an exploded view and a break away view.

The graphic tablet surface 18 may consist of a thin layer of a transparent material such as indium tin oxide or other suitable material; thus it cannot be distinguished for the display screen 16 in FIG. 1, but can be sen in FIG. 2 and 3 in exploded view. The stylus 14 has an electrical cable 20 connecting it to the computing means 24. The graphic tablet surface 18, the stylus 14 the stylus-computer cable 20 and its control electronics make up a stylus position encoding means. The control electronics is typically located on a printed circuit card inside the computing means. Stylus encoding means are well known to those skilled in the art. The mouse unit is comprised of a hand unit and electrical cable, which is connected to the computing mean's serial port or bus interface.

A telephone means 28 may be located on table support means near the display device and keyboard. The addition of the telephone means to be computer workstation provides for both voice and data communications, simultaneously. The telephone means may be connected to the computing means 24 via an electrical telephone-computer cable 29. Specific circuitry in the computing means may integrate the voice signals with text/graphic data, well known to those skilled in the art. The computing means may be connected to an external communication means for transmitting and receiving data to and from a communications network 52. The electrical connection to the communications network is via an external communication 49. The communications network 52 is defined to be any appropriate communication system or network, in which data is transmitted and/or received to and from local or remote devices. Examples of such a communication network include the conventional telephone system, private telephone exchanges, computer local area networks, wide area networks, RS-232 serial interface, and many other types of communication systems. The telephone means 28 may be a speaker-type telephone, where the hands of the user are free to type on the keyboard or to write with the hand-held stylus. In an alternative embodiment, the telephone means may be connected directly to the communications network without going though the computer means. In an alternative embodiment, the computing means' functions may be incorporated into the display control circuitry.

The computer keyboard unit 12 may be a standard alphanumeric type keyboard or a special application specific keyboard design. As shown in FIG. 1, the keyboard unit is mounted in front of the workstation for easy access by the user. The keyboard is electrically connected to the computer with a cable in the standard manner, well know to those skilled in the art. The computing means 24 may be located in several different positions, but a convenient position may be vertical mounted under the table support 26, as shown in the figure.

FIG. 2 shows a right side view of one embodiment of the computer workstation, embodied with a CRT display monitor 40, which is a specific type of display device. For clarity, this figure does not show the telephone means 28, but it does show the telephone-computer cable 29. Some elements of the figure are shown with hidden lines and other elements are shown in a break-a-way view. A front display hinge 36 may be located at side of the CRT monitor, near the front lower edge. Other hinge components may be located on the other side of the monitor, which is hidden from view, or located along the front bottom edge of the monitor. The purpose of the front display hinge is to give the user the capability of rotating the CRT monitor through a multiplicity of angles from the horizontal to the vertical orientation, depending on the user's wishes. Element 36 includes a locking mechanism to fix the display device at the desired screen orientation as shown. One such locking means may be a simple turn-down knob. The rotation may be assisted by a display orientation adjustment means 44, located between the CRT monitor 40 and the table support 26. The adjustment means is discussed further below.

The computer workstation 10 may be realized with several types of computers or processors, having a wide range of processing powers, capabilities and sizes. Typically, the computing means 24 will have a central processing unit, internal memory, arithmetic logic unit, internal data bus, memory bus, device controllers, and other component well known to those skilled in the art. The computing means 24 will also process stored programs, algorithms and software, including but not limited to machine language, operating system, assembly languages, high level computational languages, and application software. The software may include text and graphic primitive programs to assist in the generation and manipulation of text and graphic workstation functions. Such software is known to those skilled in the field.

The means to encode a stylus position over the tablet area into electrical signals can be accomplished by several techniques. Among the prior art of encoding means are (1) measurement of x and y time delays via surface acoustic wave, (2) surface resistive sheet, (3) membrane pressure, (4) magnetic field means and (5) air acoustic means. In some embodiments, the tablet surface maybe a thin film applied to the display screen. In other embodiments, the tablet or encoding area may represent an area on the display screen, without a physical embodiment i.e., air space between sensors. There are many types of graphic tablets that are presently on the market, including the SummaSketch® from Summagraphics Corporation, E-Z Image™ from Ovonic Systems Inc., or Scriptel™ from Scriptel Corporation. Typically, the stylus position is measured at a rate of about 100–500 points/second in both the x and y directions over the tablet's active area. The tablet electronics, located near the tablet, in the stylus, or on the tablet-computer interface card, converts these measurements into a digital code (encoded) and arranged into digital words or bytes (typically, 8 or 16 bits long). The resolutions of these devices are in the 200–300 dots/inch range.

As presented in FIG. 2, the graphic tablet means is comprised of the graphic tablet surface 18 and the stylus 14 elements. They are presented in an exploded view, in order to show the reader the distinction between the tablet and the display screen 16. The space shown between elements 16 and 18 would not be apparent in the disclosed embodiment. The stylus 14 is shown with the cable 20 connecting it the computing means. The term graphic tablet and stylus encoding means are equivalent. Depending on the type of graphic tablet employed, the cable may not be necessary. The cable can be removed if the stylus contains small batteries for electrical power. Electrical cable 20 connects the graphic tablet to the computing means 24 for control. The electrical interface between the tablet and computing means can be a serial RS-232 interface, a parallel bus interface, or other standard computer-device interfaces. In FIG. 2, at least one electrical cable 42 connects the CRT monitor 40 to the computing means 24 for control of the display functions. The electrical interface is of the standard type well known to those skilled in the display terminal or workstation field. Typically, either digital TTL signals (representing video) or analog RGB video signals are provided to the CRT monitor.

Many types of CRT display monitors could be used in the workstation, but it is preferred that a relatively high resolution (70 dots/inch or higher) flat screen type be used. One possible candidate CRT that is presently available is the Zenith™ Data System's Model ZCM-1490 Flat Screen CRT Monitor. The monitor is a color CRT display capable of displaying the IBM® VGA Standard 620×480 pixels at a center screen pitch of 0.28 millimeters. This resolution is sufficient for reasonable quality graphics. The main advantage of the monitor is its flat screen. For the invention disclosed here, the flat screen results in a natural writing surface, when combined with a graphic tablet. Other curved surface CRTs could be used, but a flat screen is a preferred embodiment. Although either monochrome or color display could be used, color displays are preferred, because they can produce a high brightness background color, for example white. A bright display background is important in order to reduce the perceived glare from the display-tablet screen. Of course, color displays are also preferred because of improved human information recognition, well known in the human factors field.

As shown in FIG. 2, a display orientation adjustment means can be used to continuously adjust and lock the display monitor and its display screen in a multiplicity of screen orientations. The orientation adjustment means may be comprised of a display rotation adjustment means 44 and a display elevation means 38. The display rotation adjustment means may in turn be comprised of a base adjustment support-hinge 44A, a spring loaded mechanism 44B, an azimuth angle hinge represented by elements 44 C and 44D, an a front display hinge 36. The display monitor may be pivotally mounted with the front hinge 36 mounted on support member 23, as shown in FIG. 1. An elevation means 38 may be comprised of a vertical slot in support member 23, in which the pivot pin of the front hinge can slide up or down for elevation adjustment. In this embodiment, the display monitor will be capable of inclination or tilt rotation A, about a horizontal axis and vertical elevation translation movement B.

Alternately, the display monitor may not be pivotally supported at the front edge of the monitor, but pivotally supported at the underside of the monitor with a lower azimuth angle hinge element 44C and top azimuth angle hinge element 44D. In this embodiment, the monitor can be orientated and adjusted in inclination angle rotation, elevation translation, and azimuth angle rotation about a vertical axis. The spring loaded mechanism 44 B will assist the user in rotating a heavy display monitor through the range of inclination angles. Spring loaded mechanisms are well known to those skilled in the art, such as mechanisms used in a fold-down sewing machine apparatus.

The accommodation of vertical elevation adjustment and azimuth angle is desirable feature, allowing the user to adjust the display device to suit his or her preference and/or the computing application. The display orientation adjustment means is shown in a schematic representation, since such mechanisms are well known to those skilled in the art. Many different types of adjustment mechanisms may be incorporated into the workstation invention.

As shown in FIG. 2, the keyboard may be mounted in such a manner so that it can slide under the table support, shown as translation D, and/or it may swing down out of the way, shown as rotation C. A keyboard hinge 32 and a slide 34 are shown in the figure, both are well known to those skilled mechanics in the art.

Instead of a CRT display monitor, the workstation may be embodied with a flat panel display device. One possible embodiment is shown in shown in FIG. 3 with flat panel display device 27. Flat panel displays devices include electroluminescent, liquid crystal, plasma, electrochromic, and electrophoretic display technologies. The primary characteristic of these type displays is the relatively thin structure with a lack of bulkiness. This lack of depth is an advantage since it reduces the mass and volume of the display device. This makes it easier to manufacture the computer workstation, resulting in a lower cost and an improved ergonomically designed workstation. The lower mass display device may obviate the need for a spring loaded mechanism. A display panel orientation adjusting means shown as element 50 may be embodied many different ways, and is easier to realize than that required for CRT monitors. The display panel orientation adjusting means 50 may be comprised of a rear support-hinge 50A, a mid adjustment hinge 50B, a ball-in-socket hinge 50C, which is attached to the rear of the display device, and two or more support arms. The display device in this embodiment can then be continuously adjusted through relatively large inclination rotations A, elevation translations B, and azimuth angle rotations about a vertical axis. The orientation adjustment means includes a position locking mechanism.

Since a relatively high resolution display device is required in this system, the active matrix liquid crystal display (LCD) panel is a preferred flat panel technology of choice. The advantages of LCD panels are their low power, light weight, VGA resolution, and the possibility of color. Presently, the disadvantages of LCDs are their high cost, low brightness, low contrast, and limited grey scale and color. The other display technologies have even greater limitations, making it difficult to realize a useful display device. This however, may change in the future when improvements in flat panel display technology will undoubtedly be made. The electrical signals between a flat panel display and the computing means, carried by cable 42 of FIG. 3, differ from that of the CRT. Flat panel displays are typically driven by matrix addressing techniques, requiring significant circuitry to be located at or near the panel. Data to be transferred between the display and the computing means will consist of digital words containing a number of bits for x and y addresses, write and erase data, color information, scan data, etc. Such interfaces are well known to those skilled in the art of display technology.

The other elements of FIG. 3, with like element numbers, are equivalent to those of FIG. 2. The preferred workstation embodiment is the one using flat panel display device 27 and display orientation adjustment means 50 as shown in FIG. 3. One reason for this preference is the ease of adjusting means and potentially better quality display. However, the low cost of CRT monitors may be an advantage if the cost continues to be less than equivalent flat panel displays.

Figure 4B:
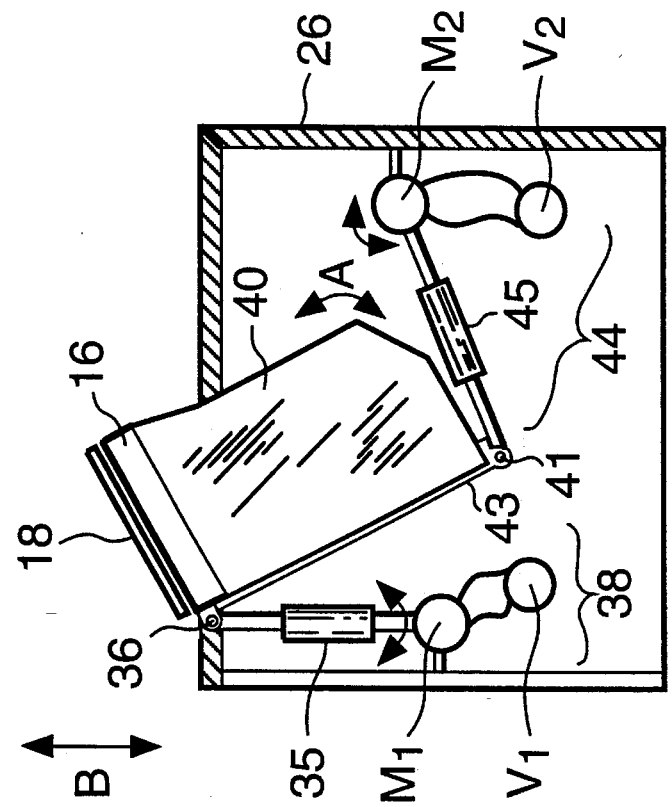
FIG. 4A and 4B are right side section views of another CRT monitor embodiment of the invention showing two monitor positions.
Figure 4A:
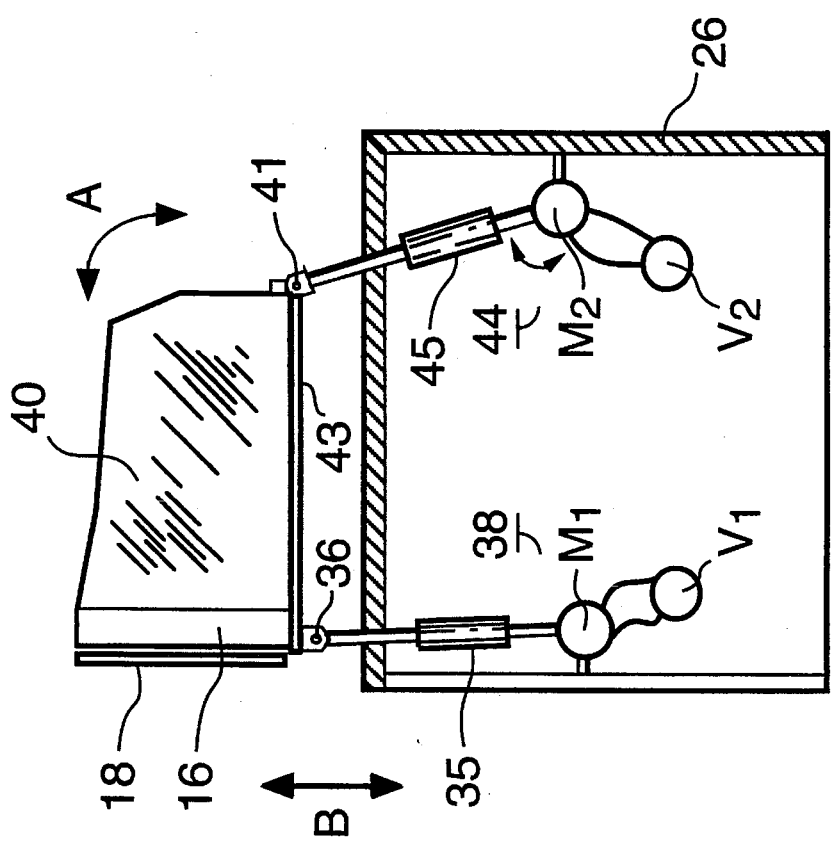

FIG. 4A and 4B show another embodiment of the orientation adjustment means, in which electric motors are used to power the display elevation means 38 and the display rotation adjustment means 44. FIG. 4A shows the CRT monitor adjusted in elevation B to a height well above the table support 26. FIG. 4B shows the CRT monitor adjusted to a screen inclination of about 30 degrees from horizontal. This embodiment is especially useful when the display devices are heavy and bulky, such as CRT monitors. FIG. 4A and 4B show two reversible electric motors: front motor $M_1$ and rear motor $M_2$. The motors are employed to move the display elevation linkage means 35 and display inclination linkage means 45, respectively. Electrical power to the front motor $M_1$ and rear motor $M_2$ are supplied by voltage sources $V_1$ and $V_2$, respectively. Thus the CRT monitor 40 is oriented in both elevation by the display elevation means 38 and inclination by the display rotation adjustment means 44.

As in the other embodiments, an encoding means 18 is placed over the CRT monitor screen 16. The display rotation A is about the front display hinge 36. As shown in the FIG. 4B, the inclination angle of the screen can be adjusted via a reversible electric motor $M_2$ to a multiplicity of screen angles.

The Display inclination linkage means 45 connects the rotating shaft of the motor to a CRT monitor cradle 43, which is a frame that is rigidly fixed to the CRT monitor 40. Many types of mechanical arms, linkages and hinges may be used to implement the display inclination linkage means 45. A rear hinge 41 connects the linkage means 45 to the CRT monitor cradle structure. The shaft of $M_1$ is connected to the display elevation linkage means 35, which connects to the front portion of the monitor cradle structure 43, via a the front display hinge 36. Several types of mechanical arms and linkages may be used to implement the elevation adjusting linkage means. Thus the two motors can independently move the front or rear of the CRT monitor to provide quick and easy orientation adjustment of the display screen. The orientation adjustments in this embodiment includes elevation B and rotation A movements.

The scope of the invention disclosed here should be determined by the appended claims and their legal equivalents, rather than by the examples given above.

I claim:

1. A display device position adjusting apparatus, which comprises:
   a. a table support structure defining a horizontal surface member and a plurality of vertical support members fixed to the horizontal surface, the horizontal surface member having an opening sufficiently large that the display device can fit inside the opening and moved in a multiplicity of orientations;
   b. means for adjusting the display device through a large range of orientations, wherein the adjusting means is attached to the table support structure, such that the display device can be adjusted to position well above and below the table support structure horizontal surface an can be locked into a fixed position, and wherein the adjusting means provides:
      (1) a front reversible motor connected to a display elevation linkage means and front display hinge, for elevation adjustment, and
      (2) a rear reversible motor connected to a display inclination linkage means and rear hinge, for inclination rotation adjustment, wherein each linkage means is connected to the to a display device cradle in which the display device sits;
   c. said table support structure being suitable for a computer desk, capable of supporting computer related devices; and
   d. said adjusting means may be comprised of a plurality of electrical and mechanical adjustment means.

2. An apparatus as recited in claim 1, in which the orientation adjusting means includes adjusting the azimuth angle of the display device in addition to other orientation adjustments, wherein the display device can be locked into place.

3. An apparatus as recited in claim 1, in which the orientation adjustment means is replaced by a spring-loaded mechanism means, wherein the mechanism means acts to apply a force to the weight of the display device to assist in the orientation adjustment of the display device.

4. A system, which comprises:
   a. a Cathode Ray tube (CRT) display;
   b. means for encoding the position of stylus or pen over an encoding area, wherein the encoding means is interfaced to the CRT display for control, such that when the stylus is moved over the encoding area, the position of the stylus is encoded into a continuous stream of electrical signals;
   c. a table support structure defining a horizontal surface member and a plurality of vertical support members fixed to the horizontal surface, the horizontal surface member having an opening sufficiently large that the CRT display can fit inside the opening and moved in a multiplicity of orientations;
   d. means for adjusting the CRT display through a large range of orientations, wherein the adjusting means is attached to the table support structure, such that the CRT display can be adjusted to position well above and below the table support structure horizontal surface and can be locked into a fixed position, and wherein the adjusting means provides:
      (1) a front reversible motor connected to a display elevation linkage means and front display hinge, for elevation adjustment, and
      (2) a rear reversible motor connected to a display inclination linkage means and rear hinge, for inclination rotation adjustment, wherein each linkage means is connected to the to a display device cradle in which the display device sits;
   e. said table support structure being suitable for a computer desk, capable of supporting computer related devices; and
   f. said adjusting means may be comprised of a plurality of electrical and mechanical adjustment means.

* * * * *

UNITED STATES PATENT AND TRADEMARK OFFICE
CERTIFICATE OF CORRECTION

PATENT NO. : 5,589,849
DATED : Dec. 31, 1996
INVENTOR(S) : Richard J. Ditzik

It is certified that error appears in the above-indentified patent and that said Letters Patent is hereby corrected as shown below:

At Col. 9, Claim 1, line 41, change word "an" to -- and --.

At Col. 5, line 4, change word "sen" to word -- seen --.

Signed and Sealed this

Twenty-second Day of April, 1997

*Attest:*

BRUCE LEHMAN

*Commissioner of Patents and Trademarks*

*Attesting Officer*